United States Patent
Takizawa (10) Patent No.: US 7,375,847 B2
(45) Date of Patent: May 20, 2008

(54) OPTICAL SCANNING DEVICE AND IMAGE FORMING APPARATUS USING THE SAME

(75) Inventor: Tokuji Takizawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 954 days.

(21) Appl. No.: 10/849,122

(22) Filed: May 20, 2004

(65) Prior Publication Data

US 2004/0246535 A1 Dec. 9, 2004

(30) Foreign Application Priority Data

Jun. 4, 2003 (JP) ............................. 2003-159492

(51) Int. Cl.
*G06F 15/00* (2006.01)
*G06K 1/00* (2006.01)
*G06K 15/10* (2006.01)

(52) U.S. Cl. .................. 358/1.7; 359/204; 359/217; 359/242; 347/241; 347/242

(58) Field of Classification Search ............. 359/205, 359/206; 358/1.7; 347/241, 129; 250/234
See application file for complete search history.

(56) References Cited

U.S. PATENT DOCUMENTS

| | | | | |
|---|---|---|---|---|
| 4,299,438 A | * | 11/1981 | Minoura | 359/205 |
| 4,864,326 A | * | 9/1989 | Kawamura et al. | 358/1.7 |
| 6,288,734 B1 | * | 9/2001 | Matsuoka | 347/241 |
| 6,304,360 B1 | * | 10/2001 | Sekikawa | 359/206 |
| 7,057,632 B2 | * | 6/2006 | Yamawaki et al. | 347/129 |
| 2002/0179827 A1 | * | 12/2002 | Kimura | 250/234 |

FOREIGN PATENT DOCUMENTS

| | | |
|---|---|---|
| JP | 10-327302 | 12/1998 |
| JP | 2001-51226 | 2/2001 |

* cited by examiner

*Primary Examiner*—King Y. Poon
*Assistant Examiner*—Akwasi M Sarpong
(74) *Attorney, Agent, or Firm*—Fitzpatrick, Cella, Harper & Scinto (57) ABSTRACT

An optical scanning device has: a first optical system for converting a flux of light that has been emitted from a light source into another flux of light; a second optical system for focusing the flux of light that has been converted by the first optical system as a linear image elongated in the main scanning direction; deflecting means for reflecting and deflecting the flux of light that has left the second optical system; and a third optical system for guiding the flux of light that has been deflected by the deflecting means onto a surface to be scanned. The flux of light emitted from the light source is entered into a deflection surface of the deflecting means at a limited angle in the sub-scanning section and, by setting parameters in a manner that satisfies a given condition, the pitch unevenness can effectively be reduced in the optical systems.

9 Claims, 10 Drawing Sheets

OPTICAL SCANNING DEVICE AND IMAGE FORMING APPARATUS USING THE SAME

BACKGROUND OF THE INVENTION

1. Field of the Invention

The present invention relates to an optical scanning device and an image forming apparatus using the same. More specifically, the invention relates to reduction in pitch unevenness in an optical scanning device where a flux of light emitted from light source means enters a deflection surface of deflecting means at a given angle in the sub-scanning section and the flux of light reflected and deflected by the deflecting means is applied to a recording medium (photosensitive drum) surface to record image information. The optical scanning device of the present invention is suitable for an image forming apparatus that involves an electrophotographic process, such as a laser beam printer, a digital copying machine, and a multi-function printer.

2. Related Background Art

Various multi-beam optical scanning devices which achieve multi-color by making fluxes of light enter into a common scanning optical system have been proposed in the past. To irradiate surfaces to be scanned with fluxes of light separately in this type of multi-beam optical scanning device, the light fluxes have to be separated after deflected and reflected by a light deflector (e.g., polygon mirror), and if sources of the light fluxes have the same wavelength, spatial separation is necessary. Objective spatial separation is achieved by, for example, making the fluxes of light enter into a deflection surface (reflection surface) of a light deflector from an oblique direction in the sub-scanning section (hereinafter referred to as oblique incidence).

Figure 15A:
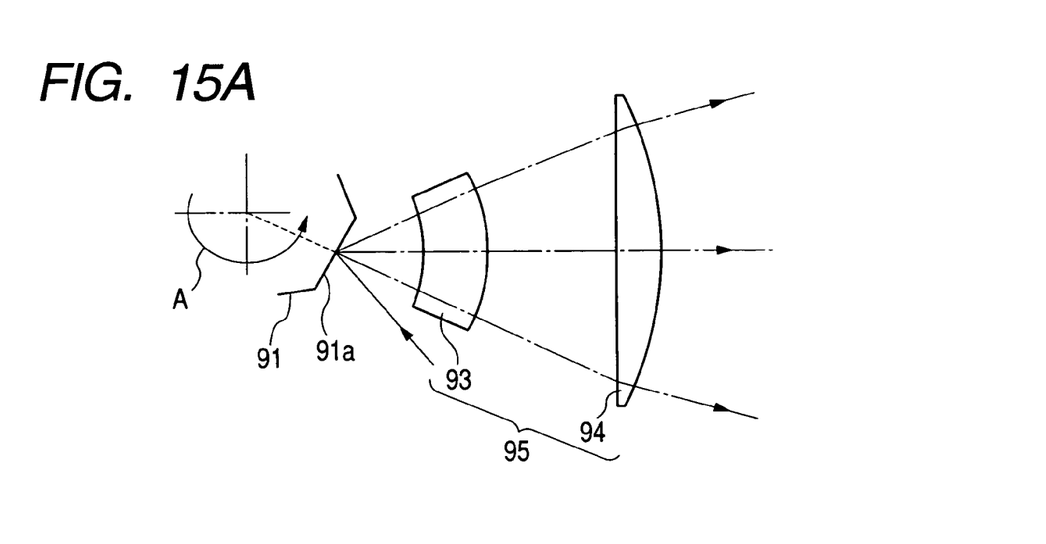
FIGS. 15A and 15B are schematic diagrams showing the critical part of a conventional optical scanning device.
Figure 15B:
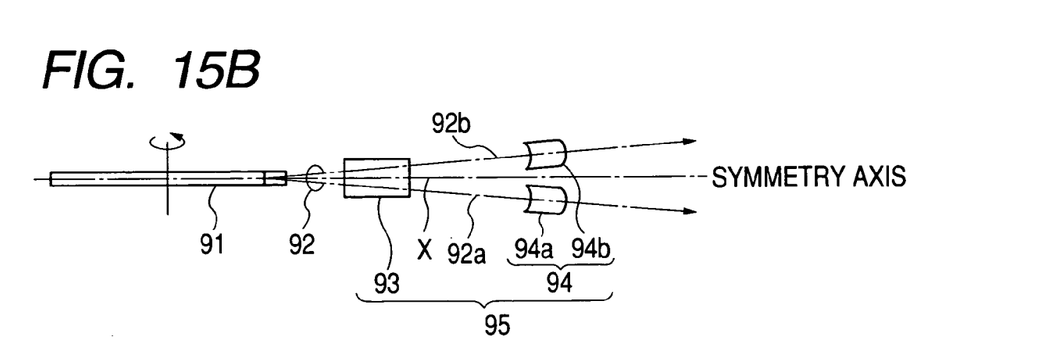

FIGS. 15A and 15B are partial sectional views showing oblique incidence in an optical system of a multi-beam optical scanning device. FIG. 15A shows the main scanning section whereas FIG. 15B shows the sub-scanning section perpendicular to the paper plane of FIG. 15A. Illustrated in FIGS. 15A and 15B are two fluxes of light entered into a deflection surface of a light deflector from opposing directions and the behavior of the light fluxes after they are deflected and reflected by the deflection surface.

In FIGS. 15A and 15B, reference numeral 91 denotes a light deflector, for example, polygon mirror. 92a and 92b denote two oblique incident rays deflected and reflected by the polygon mirror 91. 95 denotes a scanning lens system (fθ lens system) composed of a cylindrical lens 93 and toric lenses 94a and 94b (a two-lens system). The cylindrical lens 93 has a given refractive power only in the main scanning section.

An incidence optical system, which is not shown in FIGS. 15A and 15B, makes two fluxes of light enter obliquely into the polygon mirror 91. In the incidence optical system, two light fluxes are emitted from two light sources (the number of light sources corresponds to the two oblique incident rays 92a and 92b), are converted into parallel pencils of light by a collimator lens, and then form a linear image in the vicinity of a deflection surface 91a of the polygon mirror 91 with the help of a cylindrical lens that has a given refractive power only in the sub-scanning section. This is a measure taken to correct a tilt of the polygon mirror's deflection surface within the sub-scanning section by placing the polygon mirror's deflection surface and a surface to be scanned (photosensitive drum surface) in an optically conjugate relation. In short, the incidence optical system constitutes a deflection surface tilt correction optical system.

The two light fluxes deflected and reflected by the polygon mirror 91 (the oblique incident rays 92a and 92b) are led to given positions on surfaces of photosensitive drums by the scanning lens system 95 through their respective light path-bending mirrors (not shown in the drawings). As the polygon mirror 91 is rotated, the rays draw scanning lines in the axial direction (main scanning direction in which deflection scan with the light fluxes proceeds) and rotation of the photosensitive drums which is synchronized with the rotation of the polygon mirror 91 arranges the scanning lines at regular intervals in the sub-scanning direction perpendicular to the main scanning direction.

In this way, surfaces of two photosensitive drums can simultaneously be scanned. If a scanning optical system is placed on each side of the polygon mirror to share the polygon mirror between the two scanning optical systems, exposure and development can be finished for four colors at once, thus making high-speed, full-color printing possible.

However, the principle of separation of rays through oblique incidence makes variation in distance from a rotation axis to deflection surfaces inevitable due to polygon mirror's manufacture error and the like (the difference is hereinafter referred to as "deflection surface eccentricity"). The deflection surface eccentricity makes the pitch irregular and leads to poor image reproducibility.

Therefore, while a normal scanning optical system only has to deal with pitch unevenness caused by a tilt of a deflection surface of a polygon mirror, an oblique incidence optical system has to solve pitch unevenness caused by deflection surface eccentricity in addition to pitch unevenness caused by a tilt of a deflection surface of a polygon mirror.

Although a multi-beam optical scanning device is taken as an example in the above description of prior art, conventional single-beam optical scanning devices that use oblique incidence also have the same problem.

Prior art has proposed a diversity of optical scanning devices in which pitch unevenness due to deflection surface eccentricity is reduced (see Japanese Patent Application Laid-Open No. H10-327302 and Japanese Patent Application Laid-Open No. 2001-051226, for example).

Japanese Patent Application Laid-Open No. H10-327302 discloses a technique that reduces, in the case of on-axis incidence, pitch unevenness resulting from polygon mirror's deflection surface eccentricity by setting parameters in a manner that limits the pitch unevenness to within ¼ pixel. Japanese Patent Application Laid-Open No. 2001-051226 discloses a technique that reduces, in a system where a flux of light has a given incident angle also in the main scanning section, pitch unevenness resulting from polygon mirror's deflection surface eccentricity by setting parameters in a manner that limits the pitch unevenness to within ⅕ pixel to 1/10 pixel.

Japanese Patent Application Laid-Open No. H10-327302 and No. 2001-051226 both state that pitch unevenness caused by a tilt of the deflection surface can be ignored because of a deflection surface tilt correction system provided. In actuality, however, no deflection surface tilt correction system has ever truly succeeded in correcting the tilt throughout the entire scan region since the deflection surface wobbles as the polygon mirror rotates. Furthermore, the conjugate point could be shifted by error in manufacture, arrangement and the like of an imaging lens and other components, thereby deteriorating further deflection surface tilt and increasing the pitch unevenness.

SUMMARY OF THE INVENTION

The present invention has been made in view of the above, and an object of the present invention is to provide an optical scanning device of simple structure capable of effectively reducing pitch unevenness, which is caused in an oblique incidence optical system by decentering of a deflection surface, a tilt of the deflection surface, a shift of the conjugate point, and the like, and an image forming apparatus having the optical scanning device.

According to one aspect of the invention, an optical scanning device comprises a first optical system for converting a flux of light that has been emitted from a light source means into another flux of light;

a second optical system for focusing the flux of light that has been converted by the first optical system as a linear image elongated in a main scanning direction;

deflecting means for reflecting and deflecting the flux of light that has left the second optical system; and a third optical system for guiding the flux of light that has been deflected by the deflecting means onto a surface to be scanned, wherein the flux of light emitted from the light source is entered into a deflection surface of the deflecting means at a limited angle in a sub-scanning section, and parameters are set in a manner that satisfies the following condition where α represents an incident angle with respect to a deflection surface of the deflecting means in the sub-scanning section, Φ represents an incident angle with respect to the deflection surface of the deflecting means in the main scanning section during a scan of a scanning center, P represents an ideal scanning line pitch in the sub-scanning direction on the surface to be scanned, $\beta_s$ represents a lateral magnification in the sub-scanning section in the third optical system, Δ represents a maximum relative difference in distance from a rotation axis of the deflecting means to deflection surfaces of the deflecting means, γ represents a maximum angle of tilt of the deflection surface of the deflecting means, R represents a circumradius of the deflecting means, N represents a number of facets of the deflecting means, $\theta_m$ represents a maximum deflection angle of the deflecting means, and D represents an amount of positional shift of a conjugate point:

$$\beta_s \tan\alpha \frac{\Delta(1+\cos(\phi-\theta_m))}{\cos(\phi/2-\theta_m/2)} +$$
$$\beta_s R\cos(180/N) \frac{(1-\cos(\theta_m/2))(\sin(\alpha+2\gamma)-\sin\alpha)}{\cos(\theta_m/2)\cos(\phi/2)\cos\alpha} +$$
$$D(\tan((\alpha+2\gamma)/\beta_s)-\tan(\alpha/\beta_s)) \le \frac{P}{10}$$

According to further aspect of the invention, in the optical scanning device, the following conditional expression is satisfied:

$0.5<\beta_s<1.5$

According to further aspect of the invention, in the optical scanning device, the deflecting means comprises a four-faceted polygon mirror.

According to further aspect of the invention, in the optical scanning device, the light source means has a plurality of light emitting units.

According to another aspect of the invention, an image forming apparatus comprises more than one optical scanning device set out in the foregoing, wherein fluxes of light emitted from light source means of the plural optical scanning devices enter common deflecting means and then are separately applied to different surfaces to be scanned to form an image.

According to another aspect of the invention, an image forming apparatus comprises an optical scanning device set out in the foregoing;

a photosensitive body placed on the surface to be scanned;

a developing unit for developing as a toner image an electrostatic latent image that is formed on the photosensitive body with a light beam run by the optical scanning device;

a transferring unit for transferring the developed toner image onto a transfer material; and a fixing device for fixing the transferred toner image on the transfer material.

According to another aspect of the invention, an image forming apparatus comprises an optical scanning device set out in the foregoing; and a printer controller for converting code data, which is inputted from an external device, into an image signal and for inputting the image signal to the optical scanning device.

According to another aspect of the invention, a color image forming apparatus comprises more than one optical scanning device set out in the foregoing; and a plurality of image bearing bodies respectively disposed on surfaces to be scanned in the optical scanning devices, the image bearing bodies forming images different in color from one another.

According to further aspect of the invention, a color image forming apparatus mentioned above comprises a printer controller which converts color signals inputted from an external device into image data of varying colors and which inputs the image data to the respective optical scanning devices.

DESCRIPTION OF THE PREFERRED EMBODIMENTS

Embodiment 1

Figure 1:
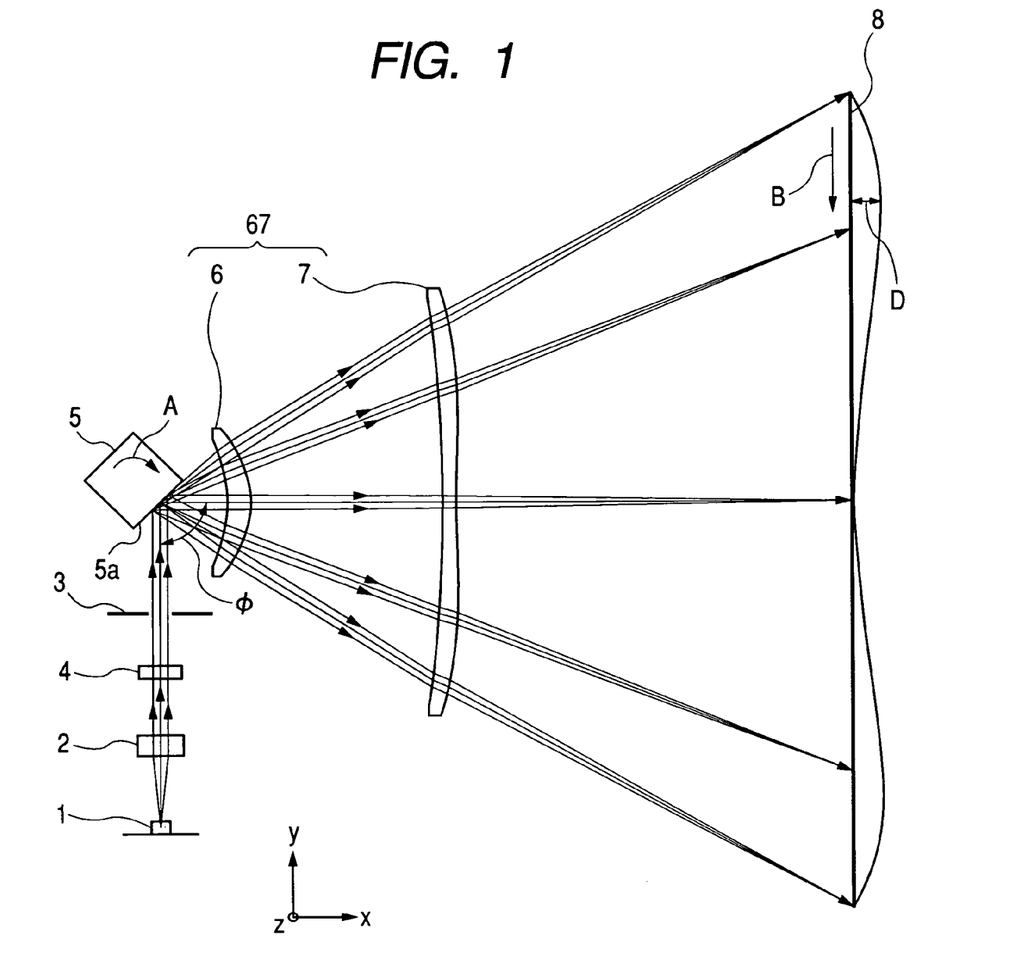
FIG. 1 is a diagram of the main scanning section according to Embodiment 1 of the present invention.
Figure 2:
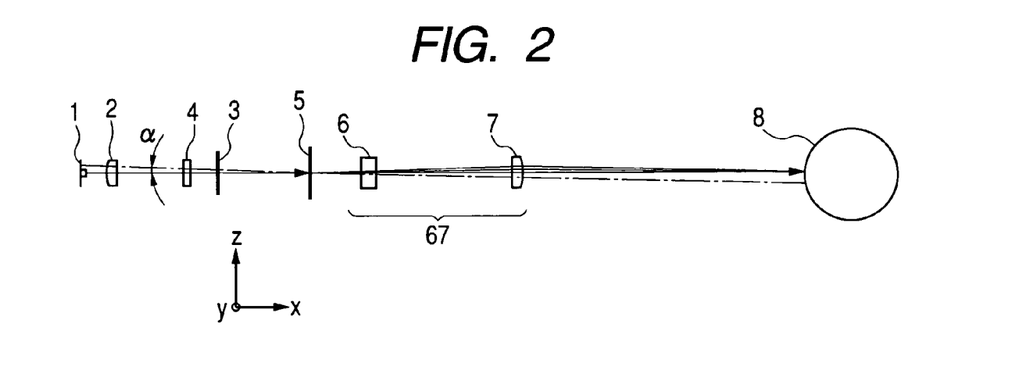
FIG. 2 is a diagram of the sub-scanning section according to Embodiment 1 of the present invention.

FIG. 1 is a sectional view showing the critical part in the main scanning direction according to Embodiment 1 of the present invention (a diagram showing the main scanning section), and FIG. 2 is a sectional view showing the critical part in the sub-scanning direction in FIG. 1 (a diagram showing the sub-scanning section).

The main scanning direction here refers to a direction perpendicular to the rotation axis of a light deflector and the optical axis of a scanning lens system (the direction toward which a flux of light is reflected and deflected (deflection scan) by the light deflector). The sub-scanning direction here refers to a direction parallel to the rotation axis of the light deflector. The main scanning section refers to a plane which is parallel to the main scanning direction and which includes the optical axis of the scanning lens system. The sub-scanning section is a plane which is perpendicular to the main scanning section.

In FIG. 1, reference numeral 1 denotes light source means such as a semiconductor laser. Reference numeral 2 denotes a light flux converting device (collimator lens) serving as a first optical system. The collimator lens 2 converts fluxes of light emitted from the light source means 1 into approximately parallel pencils of light (or convergent light fluxes or divergent light fluxes). Reference numeral 4 represents a lens system (cylindrical lens) serving as a second optical system. The cylindrical lens 4 has a given refractive power in the sub-scanning direction alone to make the light fluxes that have passed the collimator lens 2 form an approximately linear image on a deflection surface (reflection surface) 5a of a light reflector 5, which will be described later, in the sub-scanning section. Denoted by 3 is an aperture diaphragm for limiting passage of a flux of light to adjust the beam shape. The collimator lens 2, the cylindrical lens 4, the aperture diaphragm 3, and others are each a component of an incidence optical system.

The light reflector 5 serves as deflecting means and is composed of a four-faceted polygon mirror (rotary multi-facet mirror), for example. The light reflector 5 is rotated by driving means (not shown) such as a motor at a constant speed in the direction indicated by an arrow A in FIG. 1.

Reference numeral 67 is a scanning lens system (fθ lens system) serving as a third optical system, which has a condensing function and fθ characteristics. The third optical system 67 has two optical devices formed from plastic materials: a first optical device 6 and a second optical device 7. The first optical device 6 is an fθ lens nearer to the light deflector 5. The second optical device 7 is a toric lens to the right of the first optical device 6 in FIG. 1. The third optical system 67 focuses light fluxes, which are based on image information and which have been reflected and deflected by the light deflector 5, on a photosensitive drum surface 8, which is a surface to be scanned. In this embodiment, the cylindrical lens 4 and the toric lens 7 constitute a deflection surface tilt correction optical system for correcting a tilt of each deflection surface of the polygon mirror 5 as fluxes of light are reflected onto the photosensitive drum surface 8. The scanning pitch in the sub-scanning direction is thus made even.

In this embodiment, fluxes of light are optically modified and emitted from the light source means 1 in accordance with image information, and are converted into approximately parallel pencils of light by the collimator lens 2 before entering the cylindrical lens 4. Of the fluxes of light entered into the cylindrical lens 4, one in the main scanning section exits the cylindrical lens 4 as it is and enters the aperture diaphragm 3 to be partially blocked upon passing the aperture diaphragm 3 whereas one in the sub-scanning section is converged before entering the aperture diaphragm 3 to be partially blocked upon passing the aperture diaphragm 3. The fluxes of light then form an approximately linear image (elongated in the main scanning direction) on the deflection surface 5a of the light deflector 5.

At this point, the fluxes of light enter the deflection surface 5a of the polygon mirror 5 at given angles in the main scanning section and the sub-scanning section both (an oblique incidence optical system).

The fluxes of light reflected and deflected by the deflection surface 5a of the light deflector 5 form a spot-like image on the photosensitive drum surface 8 through the scanning lens system 67. As the light deflector 5 is rotated in the direction of the arrow A, the photosensitive drum surface 8 is optically scanned at a uniform velocity in the direction of an arrow B (in the main scanning direction). Thus an image is recorded on the surface 8 of the photosensitive drum, which is a recording medium.

The components of the optical scanning device in this embodiment are arranged such that fluxes of light enter the deflection surface 5a of the polygon mirror 5 at given angles in the main scanning section and the sub-scanning section both as described above. This arrangement is designed to reduce pitch unevenness.

The arrangement is described below with reference to light path diagrams of FIGS. 3 through 8.

Pitch unevenness resulting from a tilt of a deflection surface is discussed first. The pitch unevenness due to a deflection surface tilt cannot completely be eliminated by a deflection surface tilt correction system since a deflection surface of a polygon mirror wobbles with respect to an incident light flux as the polygon mirror rotates.

Figure 3:
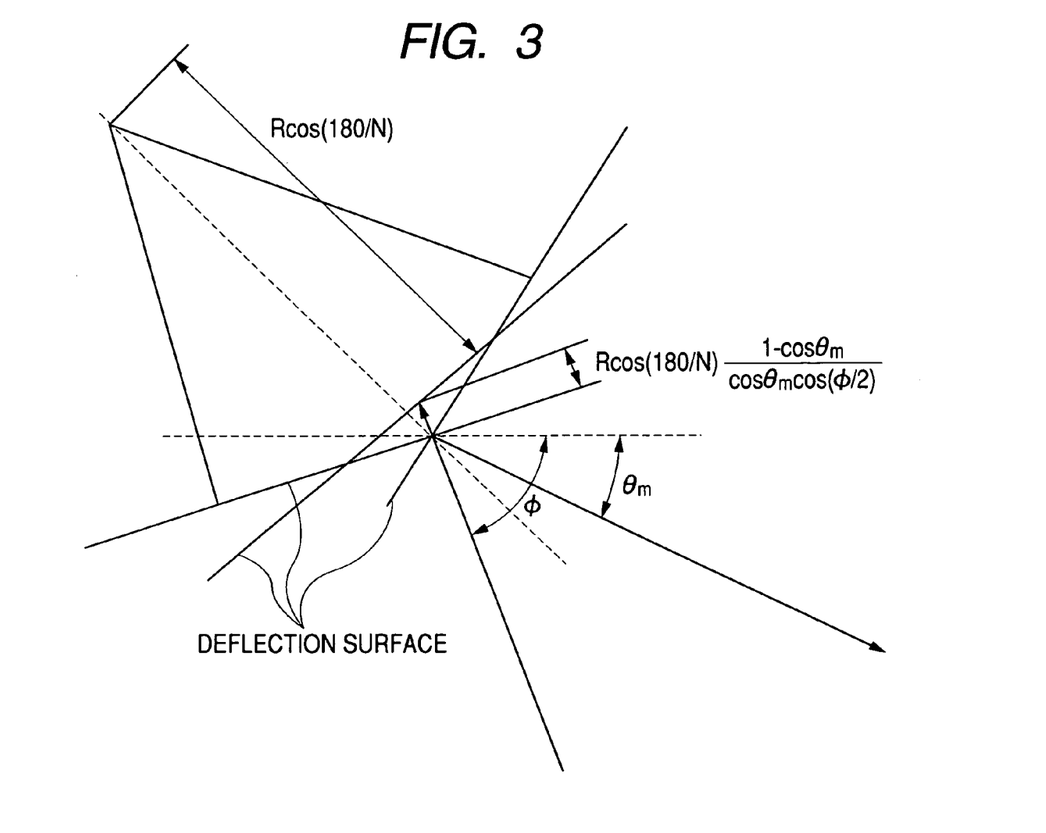
FIG. 3 is a diagram illustrating how a deflection surface of a polygon mirror wobbles as the polygon mirror rotates in Embodiment 1 of the present invention.

FIG. 3 is a diagram illustrating how a deflection surface is wobbled by rotation of a polygon mirror. When the incident angle with respect to a deflection surface in the main scanning section is given as Φ, the number of facets of the polygon mirror is given as N, the circumradius of the polygon mirror is given as R, and the maximum scanning angle is given as $\theta_m$ as shown in FIG. 3, the maximum deflection surface wobble amount S of the polygon mirror in the direction of the ray is expressed as follows:

$$S = R\cos(180/N)\frac{1-\cos(\theta_m/2)}{\cos(\theta_m/2)\cdot\cos(\phi/2)}$$

Figure 4:
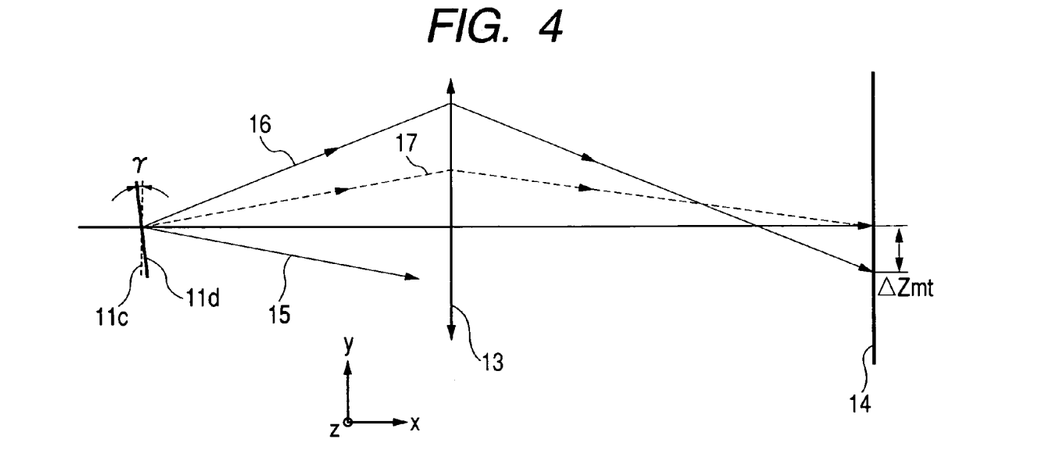
FIG. 4 is a diagram illustrating pitch unevenness due to a tilt of the deflection surface in Embodiment 1 of the present invention.

FIG. 4 is a diagram illustrating pitch unevenness resulting from a tilt of a deflection surface. In FIG. 4, when the incident angle with respect to a deflection surface of a polygon mirror in the sub-scanning section is given as α, the lateral magnification of a scanning lens system 13 in the sub-scanning section is given as $\beta_s$, and the relative difference in tilt between deflection surfaces (maximum polygon mirror surface tilt angle) is given as γ, the amount $\Delta Z_{mt}$ of pitch unevenness due to a deflection surface tilt is expressed as follows:

$$\Delta z_{mt} = \beta_s S(\tan(\alpha+2\gamma) - \tan\alpha)$$

In FIG. 4, reference symbol 11c denotes the initial position of the deflection surface, 11d denotes the position of the deflection surface when the deflection surface is tilted, 13 represents the scanning lens system, 14 represents a photosensitive drum surface, and 15, 16 and 17 each denote scanning light.

Figure 5:
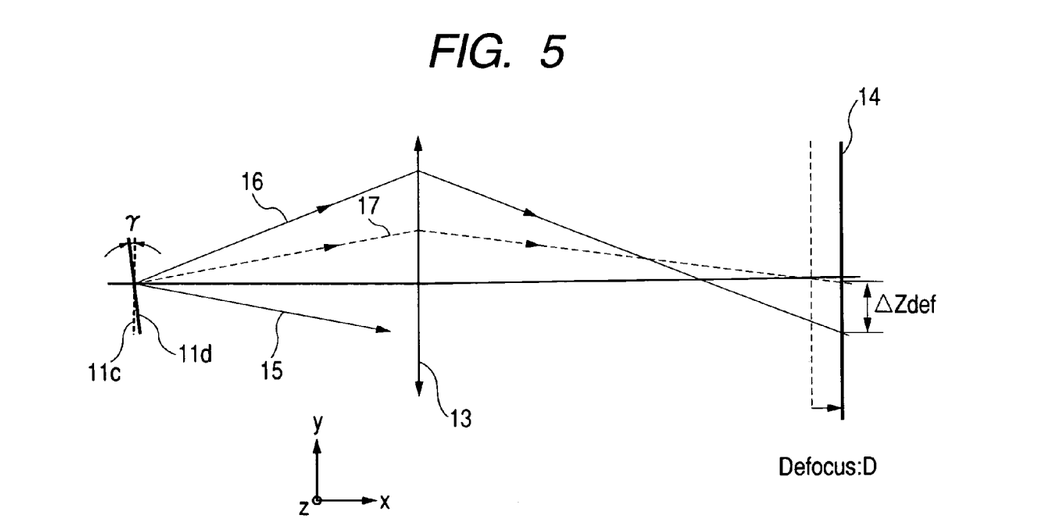
FIG. 5 is a diagram illustrating how the amount of deflection surface tilt that needs to be corrected is increased by a positional shift of the conjugate point in Embodiment 1 of the present invention.

The amount of deflection surface tilt that needs to be corrected is further increased if the conjugate relation between the deflection surface and the photosensitive drum surface is offset from the beginning because of error in manufacture, arrangement, and the like. This initial offset amount of the conjugate point is given as D as shown in FIG. 5. Then the tilt amount that needs further correction which is designated by $\Delta Z_{def}$ is expressed as follows:

$$\Delta z_{def} = D(\tan((\alpha+2\gamma)/\beta_s) - \tan(\alpha/\beta_s))$$

Since FIG. 5 is a diagram illustrating how the amount of deflection surface tilt that needs to be corrected is increased by a shift of the conjugate point, components in FIG. 5 that are identical to those in FIG. 4 are denoted by the same reference symbols and numerals.

Discussed next is pitch unevenness resulting from deflection surface eccentricity.

Figure 6:
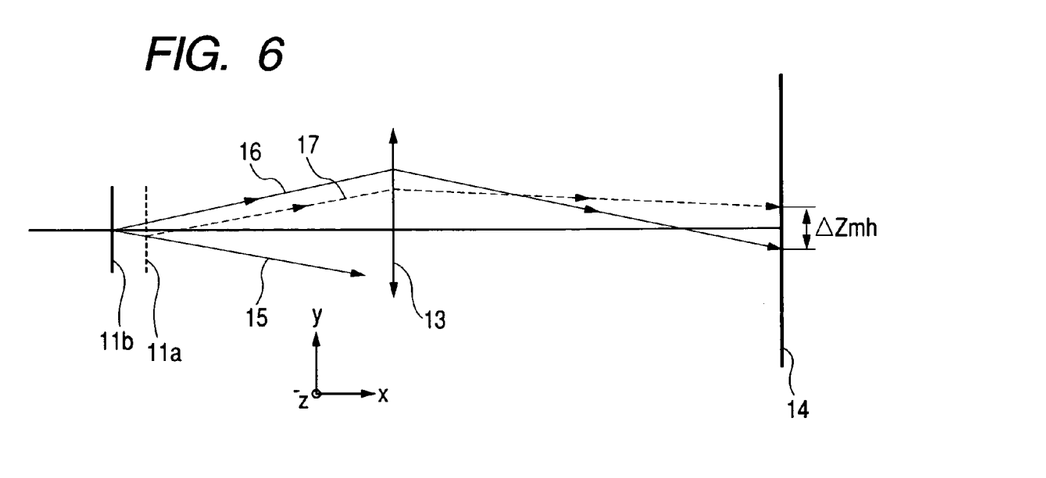
FIG. 6 is a diagram illustrating pitch unevenness caused by deflection surface eccentricity in Embodiment 1 of the present invention.

FIG. 6 is a diagram illustrating pitch unevenness caused by deflection surface eccentricity. Components in FIG. 6 that are identical to those in FIG. 4 are denoted by the same reference symbols and numerals. Reference symbol 11a in FIG. 6 denotes the initial position of the deflection surface and 11b denotes the position of the deflection surface when the deflection surface is decentered.

Figure 7:
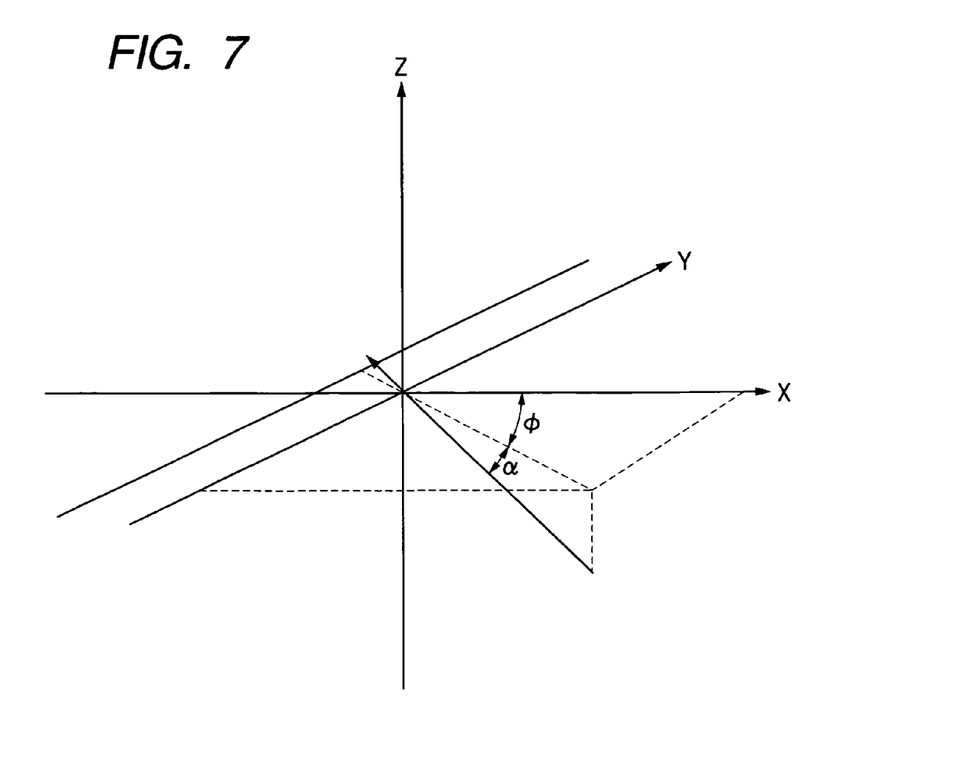
FIG. 7 is a diagram showing a light path of an incident ray in Embodiment 1 of the present invention.
Figure 8:
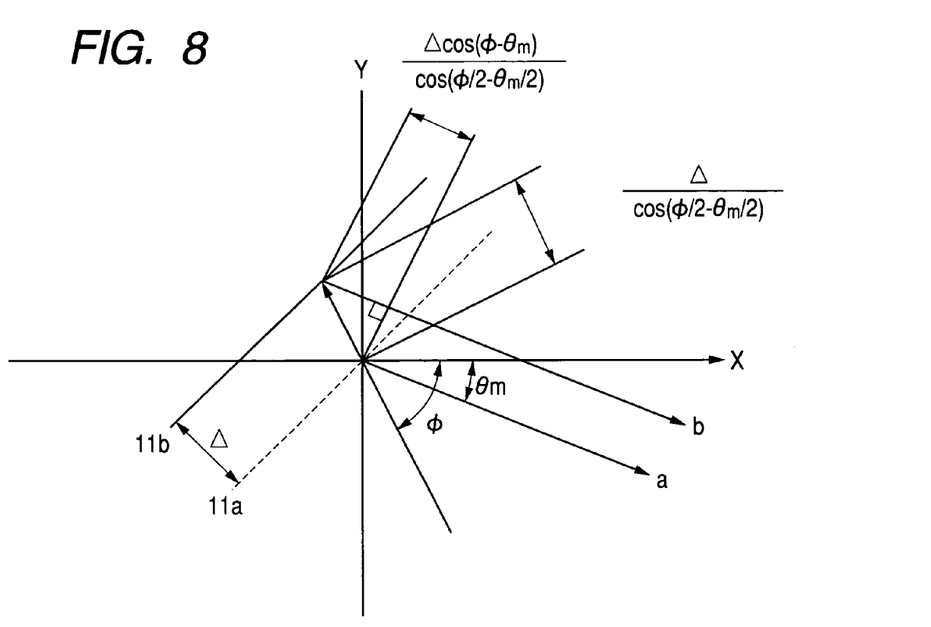
FIG. 8 is a diagram showing light paths within the x-y plane in Embodiment 1 of the present invention.

Here, the optical axis (symmetry axis) of the scanning lens system 13 constitutes the x-axis, the y-axis is set in the main scanning direction, and the z-axis is set in the sub-scanning direction (the same applies to FIGS. 7 and 8). FIG. 7 is a diagram showing a light path of a light beam entered into the deflection surface. As shown in FIG. 7, an incident ray enters the deflection surface at an angle α in the sub-scanning direction and at an angle Φ in the main scanning direction. FIG. 8 is a diagram of light paths within the x-y plane which are obtained by projecting, onto the x-y plane, light paths of when the polygon mirror keeps the initial deflection surface position 11a and when the deflection surface is decentered to arrive at the deflection surface position 11b. In FIG. 8, a light beam denoted by "a" is a ray reflected by the deflection surface that is at its initial position and a light beam denoted by "b" is a ray reflected by the decentered deflection surface. The difference in distance between the initial deflection surface position and the position of the decentered deflection surface (the amount of deflection surface eccentricity) is given as Δ, and an arbitrary angle of scanning by the polygon mirror is given as θ.

With the above setting, when the lateral magnification in the sub-scanning section of the scanning lens system is given as $\beta_s$, the amount of pitch unevenness due to deflection surface eccentricity at an arbitrary scanning angle is designated by $\Delta z_{mh}$ and expressed as follows:

$$\Delta z_{mh} = \beta_s \tan\alpha \frac{\Delta(1+\cos(\phi-\theta))}{\cos(\phi/2 - \theta/2)}$$

The pitch unevenness due to deflection surface eccentricity becomes maximum at the maximum scanning angle (maximum deflection angle) $\theta_m$. From this and above expressions, the total pitch unevenness amount in this system which is designated as Δz is expressed as follows:

$$\Delta z = \Delta z_{mt} + \Delta z_{def} + \Delta z_{mh}$$

In general, influence of pitch unevenness on image quality is ignorable when pitch unevenness is about 1/10 of a scanning line interval P in the sub-scanning direction on a surface to be scanned.

Therefore, this embodiment effectively reduces pitch unevenness in an oblique incidence optical system and obtains an image of high definition by setting the parameters such that the total amount of pitch unevenness due to deflection surface eccentricity, a deflection surface tilt, a shift of the conjugate point, and others is less than or equal to 1/10 of the ideal scanning line interval P in the sub-scanning direction. In other words, the parameters are set to satisfy the following conditional expression (1).

$$\Delta z = \Delta z_{mt} + \Delta z_{def} + \Delta z_{mh} \le \frac{P_i}{10}$$

This expression is transformed as follows:

$$\beta_s \tan\alpha \frac{\Delta(1+\cos(\phi-\theta_m))}{\cos(\phi/2 - \theta_m/2)} + \quad (1)$$

$$\beta_s R\cos(180/N)\frac{(1-\cos(\theta_m/2))(\sin(\alpha+2\gamma)-\sin\alpha)}{\cos(\theta_m/2)\cos(\phi/2)\cos\alpha} +$$

$$D(\tan((\alpha+2\gamma)/\beta_s) - \tan(\alpha/\beta_s)) \le \frac{P}{10}$$

wherein α represents the incident angle with respect to polygon mirror's deflection surface in the sub-scanning section, Φ represents the incident angle with respect to polygon mirror's deflection surface in the main scanning section during a scan of the scanning center, P represents the ideal scanning line pitch in the sub-scanning direction on the surface to be scanned, $\beta_s$ represents the lateral magnification in the sub-scanning section in the scanning lens system, Δ represents the maximum relative difference in distance from the rotation axis of the polygon mirror to deflection surfaces of the polygon mirror (the difference in amount of wobbling in the optical axis direction between the deflection surfaces), γ represents the maximum angle of tilt of polygon mirror's deflection surface, R represents the circumradius of the polygon mirror, N represents the number of facets of the polygon mirror, $\theta_m$ represents the maximum deflection angle of the polygon mirror (the rotation angle of the mirror face during a scan at an effective scan angle), and D represents the amount of positional shift of the conjugate point.

The parameters in the above conditional expression (1) are now discussed. First, if the imaging magnification in the sub-scanning section (sub-scanning magnification) is lowered, pitch unevenness due to deflection surface eccentricity and pitch unevenness due to a deflection surface tilt can be reduced whereas the amount of deflection surface tilt which is caused by a shift of the conjugate point and which needs to be corrected is increased.

Figure 9:
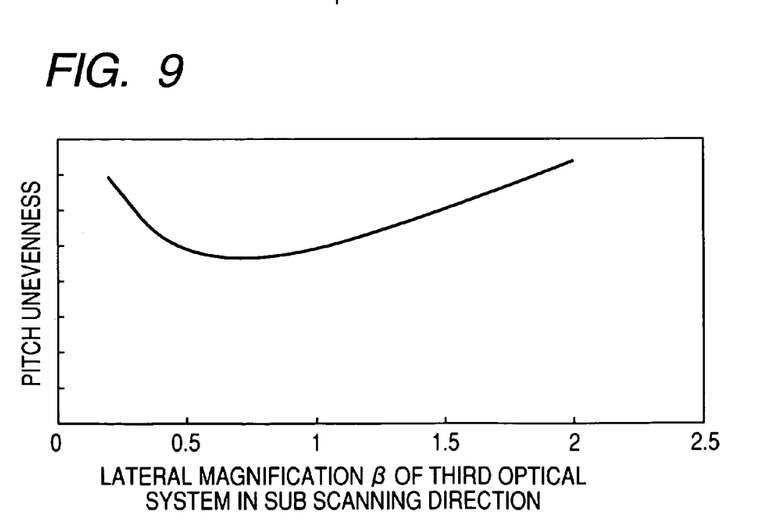
FIG. 9 is a graph showing influence of the sub-scanning magnification of a third optical system over pitch unevenness in Embodiment 1 of the present invention.

FIG. 9 is a graph obtained by plotting the amount of pitch unevenness of when the sub-scanning magnification is changed while other parameters than the sub-scanning magnification are fixed. FIG. 9 shows that, as the sub-scanning magnification is lowered, the pitch unevenness amount takes a local minimum value at a certain point and that lowering the sub-scanning magnification past this point causes a reversal, namely, an increase in pitch unevenness amount. In addition, too low a sub-scanning magnification requires large-sized lenses for the scanning lens system and is disadvantageous in terms of quantity of light.

Therefore, the imaging magnification $\beta_s$ in the sub-scanning section of the scanning lens system 67 is set in this embodiment to meet the following condition:

$$0.5 < \beta_s < 1.5 \quad (2)$$

In this embodiment, the imaging magnification $\beta_s$ is set to 1.38.

A polygon mirror with small outer diameter is preferred in this embodiment since its deflection surface is wobbled less by rotation and accordingly it is effective against pitch unevenness caused by a tilt of the deflection surface. Generally speaking, a polygon mirror has smaller outer diameter when it has fewer facets. This embodiment uses a four-faceted polygon mirror as described above, and thus the pitch unevenness resulting from a deflection surface tilt is reduced.

Numerical Example

Given next is a numerical example of Embodiment 1 of the present invention. The optical system of this device can handle image size as large as A4, and has an image resolution of 600 dpi in the main scanning direction and the sub-scanning direction each. When the image resolution is 600 dpi, a scanning line interval $P_i$ is 42.3 µm. The incident angle $\Phi$ of a light flux entered into the deflection surface in the main scanning section is 90°. The incident angle $\alpha$ of a light flux entered into the deflection surface in the sub-scanning section is 2.2°. The lateral magnification $\beta_s$ of the scanning lens system in the sub-scanning section is 1.38. The scanning system has an fθ coefficient f set to 150 mm. The maximum scanning angle $\theta_m$ is 40.8°. The polygon mirror used in this embodiment is a four-faceted polygon mirror with the circumradius R set to 10 mm. The maximum relative deflection surface tilt angle γ of the polygon mirror is 1'. The maximum relative difference Δ in distance from the rotation axis of the polygon mirror to deflection surfaces of the polygon mirror is 20 µm. The amount of positional shift D of the conjugate point due to initial arrangement error is 1 mm.

The above values of parameters are substituted into the conditional expression (1) to obtain 3.36 µm for the left side of the inequality and 4.23 µm for the right side of the inequality. Those values therefore satisfy the conditional expression (1).

As demonstrated above, this embodiment effectively reduces pitch unevenness in an oblique incidence optical system and obtains an image of high definition by setting the parameters such that the total amount of pitch unevenness due to deflection surface eccentricity, a deflection surface tilt, a shift of the conjugate point, and others is less than or equal to 1/10 of the ideal scanning line interval P in the sub-scanning direction, in other words, to satisfy the conditional expression (1).

The light source means in this embodiment is light sources each having a single light emitting unit (light emitting point). However, the light source means of the present invention is not limited thereto and can be, for example, a multi-beam light source having a plurality of light emitting units without changing anything from Embodiment 1.

The scanning lens system 67 in this embodiment is composed of two lenses, but may have a single lens or more than two lenses instead.

<Color Image Forming Apparatus>

Figure 10:
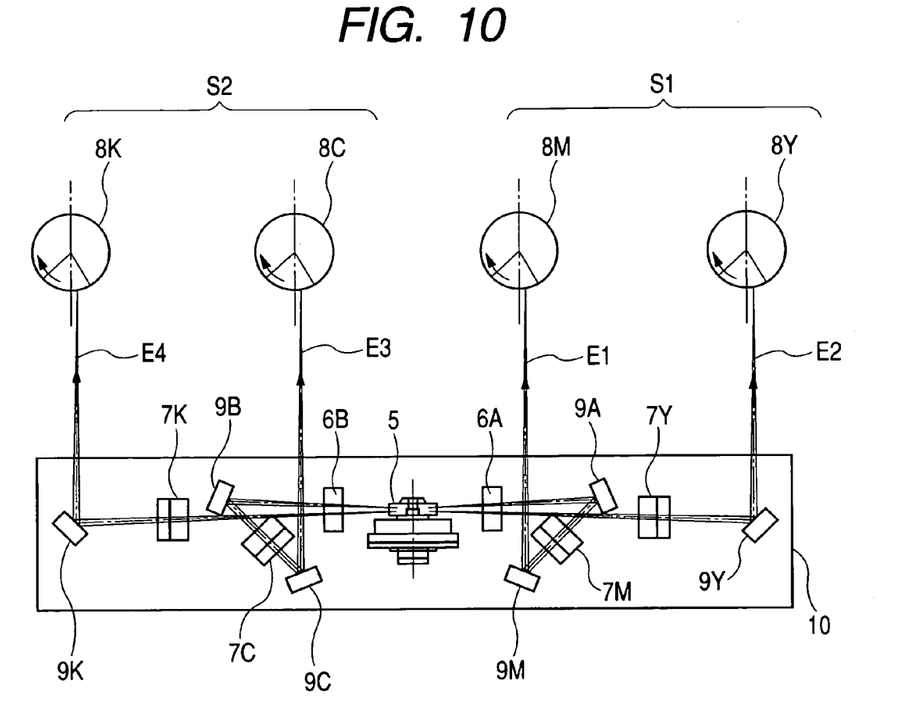
FIG. 10 is a diagram of the sub-scanning section of an optical scanning device according to Embodiment 1 of the present invention.
Figure 11:
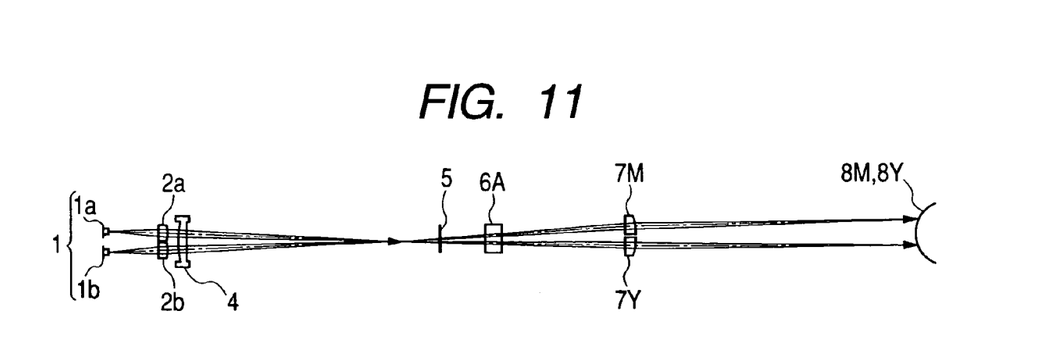
FIG. 11 is a diagram of the sub-scanning section of a scanning optical system according to Embodiment 1 of the present invention.
Figure 12:
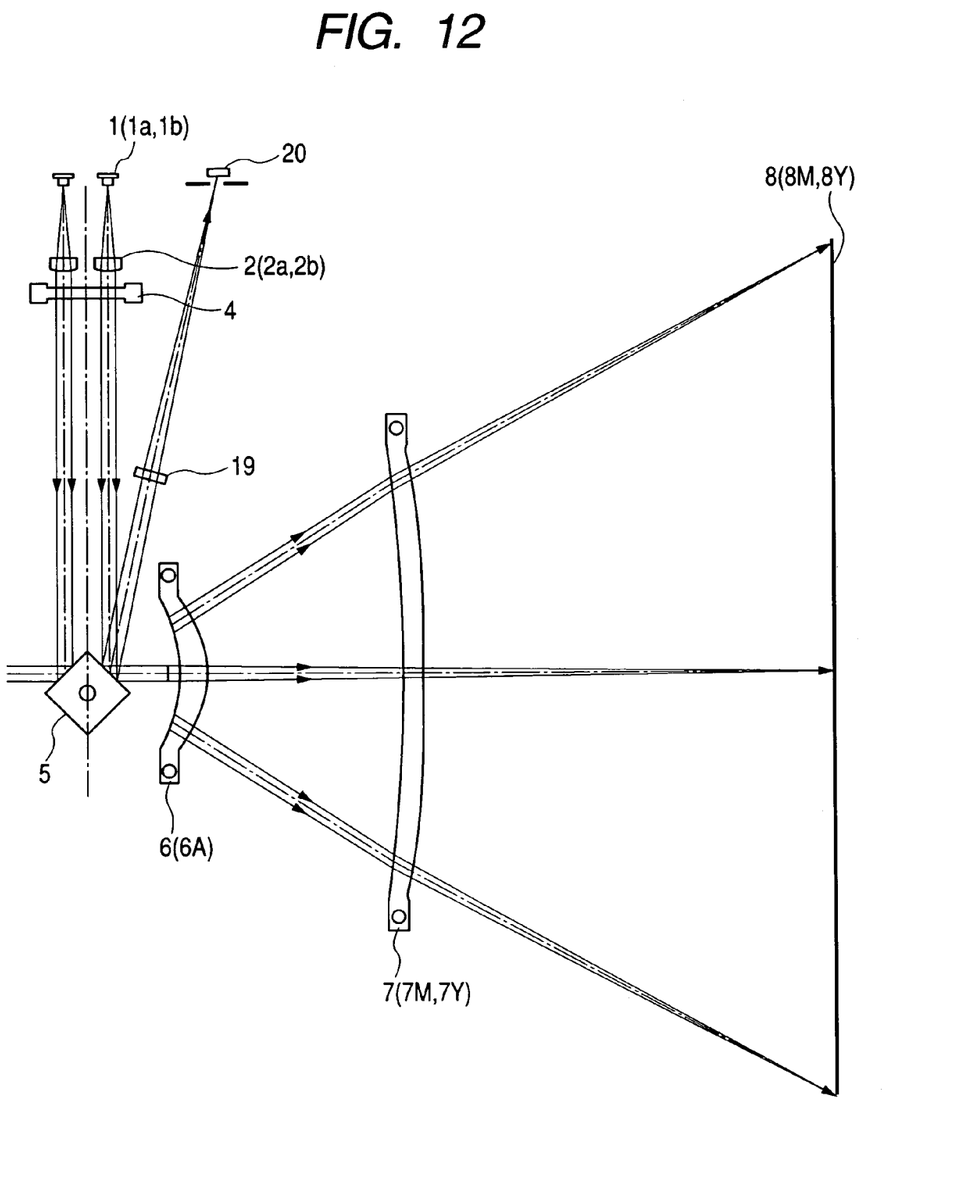
FIG. 12 is a diagram of the main scanning section of the scanning optical system according to Embodiment 1 of the present invention.

FIG. 10 is a diagram showing the sub-scanning section from a light deflector to photosensitive drums in an image forming apparatus according to an embodiment of the present invention. FIG. 11 is a diagram showing the sub-scanning section of a scanning optical system S1 from light source means to the photosensitive drums. The scanning optical system S1 is one of the scanning optical systems of FIG. 10 that is to the right of the light deflector. FIG. 12 is a diagram showing the main scanning section of the one scanning optical system S1 from the light source means to the photosensitive drums.

The image forming apparatus of this embodiment uses more than one optical scanning device which is described in Embodiment 1 and which has an oblique incidence optical system. Fluxes of light emitted from light source means of the optical scanning devices separately enter a common light deflector 5 from the left side and the right side, and are applied to different photosensitive drums to print a color image at high speed.

To give a more detailed description, fluxes of light emitted from the light source means of the optical scanning devices obliquely enter deflection surfaces of the light deflector 5 at an angle in the sub-scanning section, and are reflected by the deflection surfaces. The optical path of the reflected fluxes of light is separated by a plurality of fold mirrors, and the separated fluxes of light are respectively led onto associated photosensitive drum surfaces 8M, 8Y, 8C, and 8K to form a color image.

In order to separate rays from one another upon incidence of plural fluxes of light, the angle of oblique incidence in the sub-scanning section has to be large to a certain degree as shown in FIG. 10 and is physically difficult to reduce. Although it is possible to slightly reduce the angle of oblique incidence in the sub-scanning section if the separation is facilitated by making the rays cross before the rays reach the deflection surfaces as shown in FIG. 11, this complicates arrangement of the incidence optical system and therefore the reduction amount is about 2° at most.

<Image Forming Apparatus>

Figure 13:
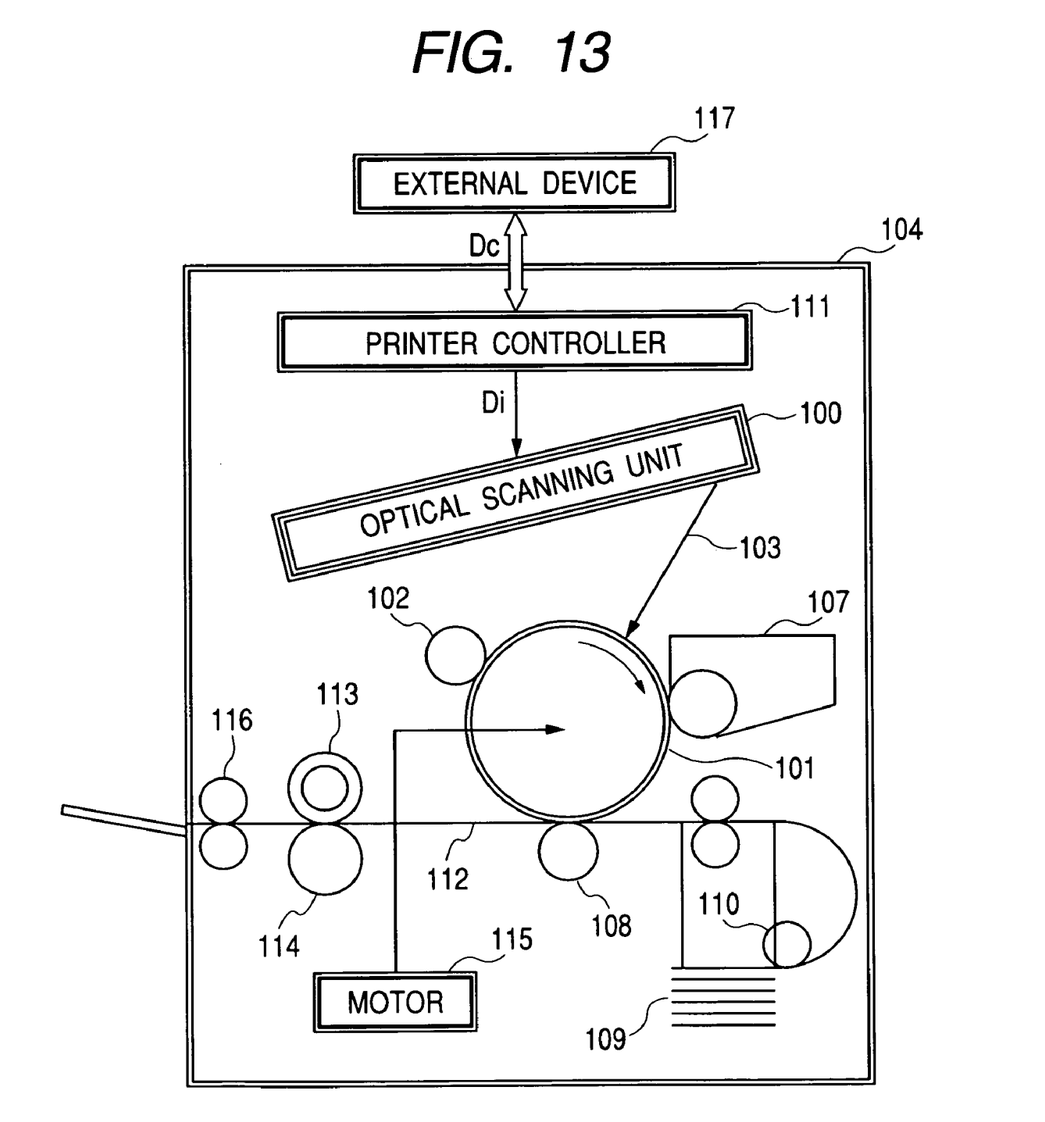
FIG. 13 is a sectional view showing the critical part of an image forming apparatus of the present invention.

FIG. 13 is a sectional view showing the critical part in the sub-scanning direction of an image forming apparatus according to an embodiment of the present invention. In FIG. 13, reference numeral 104 denotes an image forming apparatus to which code data Dc is inputted from an external device 117 such as a personal computer. The code data Dc is converted into image data (dot data) Di by a printer controller 111 provided in the apparatus. The image data Di is inputted to an optical scanning unit 100, which has the structure shown in Embodiment 1. The optical scanning unit 100 emits a light beam 103 modified in accordance with the image data Di. The light beam 103 is run on a photosensitive surface of a photosensitive drum 101 in the main scanning direction.

The photosensitive drum 101 serving as an electrostatic latent image bearing body (photosensitive body) is rotated clockwise by a motor 115. The rotation moves the photosensitive surface of the photosensitive drum 101 relative to the light beam 103 in the sub-scanning direction, which is orthogonal to the main scanning direction. A charging roller 102 is placed above the photosensitive drum 101 and brought into contact with the surface of the photosensitive drum 101 to charge the photosensitive drum surface uniformly. After being charged, the surface of the photosensitive drum 101 is irradiated with the light beam 103 run by the optical scanning unit 100.

As has been described, the light beam 103 is modified based on the image data Di and an electrostatic latent image is formed on the surface of the photosensitive drum 101 by irradiation with the light beam 103. The electrostatic latent image is developed as a toner image by a developing unit 107, which is placed downstream of the irradiation position of the light beam 103 in the rotation direction of the photosensitive drum 101 and is brought into contact with the photosensitive drum 101.

The toner image developed by the developing unit 107 is transferred onto a sheet (transfer material) 112 by a transferring roller 108, which is placed below the photosensitive drum 101 and faces the photosensitive drum 101. The sheet 112 is housed in a sheet cassette 109 in front of the photosensitive drum 101 (on the right hand side in FIG. 13). Alternatively, the sheet 112 may be fed manually. A sheet feed roller 110 is placed at an end of the sheet cassette 109 to send the sheet 112 in the sheet cassette 109 onto a sheet transport path.

The sheet 112 to which the unfixed toner image has been transferred in the manner described above is transported to a fixing device behind the photosensitive drum 101 (leftward in FIG. 13). The fixing device is composed of a fixing roller 113 and a pressure roller 114. The fixing roller 113 has a fixing heater (not shown in the drawing) inside. The pressure roller 114 is pressed against the fixing roller 113. The sheet 112 transported from the transfer unit is pressurized and heated at a portion where the pressure roller 114 is pressed against the fixing roller 113, to thereby fix the unfixed toner image on the sheet 112. Beyond the fixing roller 113 is a delivery roller 116, which delivers the sheet 112 with the fixed image to the outside of the image forming apparatus.

Though not shown in FIG. 13, other functions of the printer controller 111 than the aforementioned data conversion include control of the motor 115 and other components of the image forming apparatus and control of a polygon motor and the like of the optical scanning unit which will be described later.

<Color Image Forming Apparatus>

Figure 14:
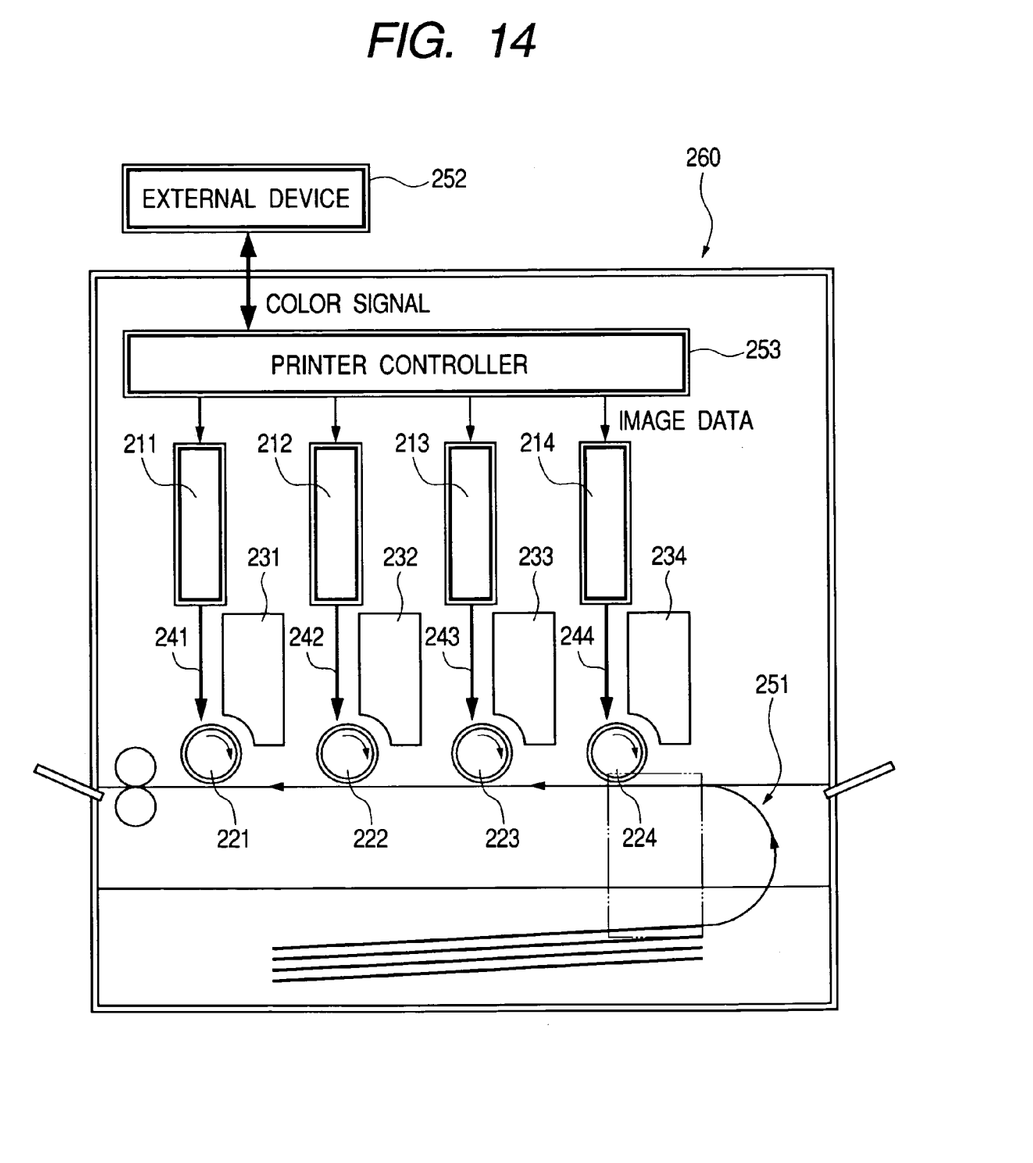
FIG. 14 is a sectional view showing the critical part of a color image forming apparatus of the present invention.

FIG. 14 is a schematic diagram showing the critical part of a color image forming apparatus according to an embodiment of the present invention. The color image forming apparatus of this embodiment is of tandem type, and has four optical scanning devices arranged side by side to record concurrently image information on surfaces of photosensitive drums, which serve as image bearing bodies. In FIG. 14, reference numeral 260 denotes the color image forming apparatus, and 211, 212, 213, and 214 each denote the optical scanning device structured as shown in Embodiment 1. Denoted by 221, 222, 223, and 224 are photosensitive drums serving as image bearing bodies. 231, 232, 233, and 234 designate developing units. 251 represents a conveyor belt.

The color image forming apparatus 260 in FIG. 14 receives, from an external device 252 such as a personal computer, color signals of R (red), G (green), and B (blue). The color signals are converted by a printer controller 253 in the apparatus into image data (dot data) of C (cyan), M (magenta), Y (yellow), and B (black). The image data are separated by color and inputted to the respective optical scanning devices 211, 212, 213, and 214. The optical scanning devices emit light beams 241, 242, 243, and 244 modified in accordance with the associated image data. Photosensitive surfaces of the photosensitive drums 221, 222, 223, and 224 are scanned with the light beams in the main scanning direction.

In the color image forming apparatus of this embodiment, four optical scanning devices (211, 212, 213, and 214) are arranged side by side and correspond to C (cyan) color, M (magenta) color, Y (yellow) color, and B (black) color, respectively, to record image signals (image information) on the photosensitive drums 221, 222, 223, and 224 concurrently and print a color image at high speed.

As described above, the color image forming apparatus in this embodiment uses light beams which are respectively based on image data and emitted from the four optical scanning devices 211, 212, 213, and 214 to form latent images of four colors on the photosensitive drums 221, 222, 223, and 224 respectively associated with the four colors. The latent images are then transferred to a recording material one on another through multilayer transfer to form one full color image.

The external device 252 may be, for example, a color image reading device having a CCD sensor. In this case, the color image reading device and the color image forming apparatus 260 constitute a color digital copying machine.

According to the present invention, an optical scanning device of simple structure and an image forming apparatus using the optical scanning device are provided which can effectively reduce pitch unevenness in an oblique incidence optical system by setting the parameters such that the total amount of pitch unevenness due to deflection surface eccentricity, a deflection surface tilt, a shift of the conjugate point, and others is less than or equal to $1/10$ of the ideal scanning line interval, in other words, to satisfy the conditional expression (1).

What is claimed is:

1. An optical scanning device comprising:
   light source means;
   a first optical system for converting a diverged flux of light that has been emitted from the light source means into another condition of flux of light;
   a rotational polygon mirror;
   a second optical system for focusing the flux of light that has been converted by the first optical system on a deflection surface of the rotational polygon mirror in a sub-scanning section; and
   a third optical system for imaging the flux of light that has been deflected by the deflection surface of the rotational polygon mirror onto a surface to be scanned,
   wherein the flux of light emitted from the light source is entered into a deflection surface of the rotational polygon mirror at a limited angle in a sub-scanning section, and the following conditional is satisfied:

$$\beta_s \tan\alpha \frac{\Delta(1+\cos(\phi-\theta_m))}{\cos(\phi/2-\theta_m/2)} +$$
$$\beta_s R\cos(180/N) \frac{(1-\cos(\theta_m/2))(\sin(\alpha+2\gamma)-\sin\alpha)}{\cos(\theta_m/2)\cos(\phi/2)\cos\alpha} +$$
$$D(\tan((\alpha+2\gamma)/\beta_s)-\tan(\alpha/\beta_s)) \le \frac{P}{10}$$

where α represents an angle between a normal to the deflection surface and the flux of light incident on the deflection surface in the sub-scanning section, φ represents an angle between the deflection surface of the rotational polygon mirror and the flux of light incident on the deflection surface in the main scanning section when a scanning center of the surface to be scanned is scanned with the flux of light deflected by the rotational polygon mirror, P represents an ideal scanning line pitch in a sub-scanning direction on the surface to be scanned, $\beta_s$ represents a lateral magnification in the sub-scanning section in the third optical system, Δ represents a maximum relative difference in distance from a rotation axis of the rotational polygon mirror to deflection surfaces of the rotational polygon mirror, γ represents a maximum angle of tilt of the deflection surface of the rotational polygon mirror, R represents a circumradius of the rotational polygon mirror, N represents a number of facets of the rotational polygon mirror, $\theta_m$ represents a maximum deflection angle of the rotational polygon mirror, and D represents an amount of positional shift from a conjugate point in a case that the deflection surface of the rotational polygon mirror and the surface to be scanned are in a conjugate relationship in the sub-scanning section.

2. An optical scanning device according to claim 1, wherein the following conditional expression is satisfied:

$0.5 < \beta_s < 1.5$.

3. An optical scanning device according to claim 1, wherein the rotational polygon mirror comprises a four-faceted polygon mirror.

4. An optical scanning device according to claim 1, wherein the light source means has a plurality of light emitting units.

5. An image forming apparatus comprising more than one optical scanning device according to claim 1, wherein fluxes of light emitted from respective light source means of the plural optical scanning devices enter a common rotational polygon mirror and then are separately applied to different surfaces to be scanned to form an image.

6. An image forming apparatus comprising:
an optical scanning device of any one of claims 1 through 4;
a photosensitive body placed on the surface to be scanned;
a developing unit for developing as a toner image an electrostatic latent image that is formed on the photosensitive body with a light beam run by the optical scanning device;
a transferring unit for transferring the developed toner image onto a transfer material; and
a fixing device for fixing the transferred toner image on the transfer material.

7. An image forming apparatus comprising:
an optical scanning device of any one of claims 1 through 4; and
a printer controller for converting code data, which is inputted from an external device, into an image signal and for inputting the image signal to the optical scanning device.

8. A color image forming apparatus comprising:
more than one optical scanning device of any one of claims 1 through 4; and
a plurality of image bearing bodies respectively disposed on surfaces to be scanned in the optical scanning devices, the image bearing bodies forming images different in color from one another.

9. A color image forming apparatus according to claim 8, further comprising a printer controller which converts color signals inputted from an external device into image data of varying colors and which inputs the image data to the respective optical scanning devices.

* * * * *

UNITED STATES PATENT AND TRADEMARK OFFICE
CERTIFICATE OF CORRECTION

PATENT NO. : 7,375,847 B2  
APPLICATION NO. : 10/849122  
DATED : May 20, 2008  
INVENTOR(S) : Tokuji Takizawa Page 1 of 1

It is certified that error appears in the above-identified patent and that said Letters Patent is hereby corrected as shown below:

COLUMN 9:
   Line 51, "is 1'." should read -- is 1°. --.

COLUMN 12:
   Line 9, "B (black)." should read -- K (black). --;
   Line 20, "B (black)" should read -- K (black) --;
   Line 31, "on" should read -- on top of --; and
   Line 67, "conditional" should read -- condition --.

Signed and Sealed this

Twenty-eighth Day of October, 2008

JON W. DUDAS  
*Director of the United States Patent and Trademark Office*